Patented Aug. 25, 1936

2,051,849

UNITED STATES PATENT OFFICE 2,051,849

MANUFACTURE OF RUBBER ARTICLES

Ezra Lloyd Hanna, North Scituate, R. I., assignor to Davol Rubber Co., a corporation of Rhode Island No Drawing. Application April 4, 1932, Serial No. 603,217

15 Claims. (Cl. 18—59)

My present invention relates to the manufacture of rubber articles, and has particular reference to the welding of rubber sheets and the like prior to vulcanization.

The physical properties of rubber are both advantageous and disadvantageous in the manufacture of rubber goods, and particularly in the manufacture of hollow articles, such as rubber bags. The crude rubber has an average plasticity of 3-6 as determined by the Williams plastometer at ordinary temperatures, this plasticity increasing with the rise of temperature and making the rubber tacky.

The tackiness is increased if the crude rubber contains resinous substances, and it is the custom to use crudes with high resin content or to add resins to the rubber when tackiness and good adhesion are desired. With proper tackiness, two pieces of rubber or rubber and cloth, will adhere, and will unite upon the application of pressure to form an inseparable union which becomes a permanent weld upon subsequent vulcanization. Rubber articles which are manufactured by welding two or more sheets or sections together therefore require an initial treatment as by dusting of a suitable powder to eliminate tackiness, in order to permit handling, a second treatment to remove the dusting powder to thus reobtain the desired tacky condition, and a final vulcanization to obtain the permanent weld. If the articles are hollow, as when making rubber bags and the like, it is necessary to interpose separating materials between the contiguous parts that are not to be welded together.

The most common powders used for dusting powders are French talc, soapstone, corn and other starches and wheat flour; the most common materials used as separating sheets are paper, sized cloth, and the like.

The removal of dusting powders to permit adhesion is accomplished by the use of naphtha, gasoline, or other solvents. This operation is never entirely successful, as some of the powder always remains on the rubber, and the resulting join is not as strong or as perfect as that produced by adhesion of two clean surfaces. Present manufacturing practice therefore includes the further step of applying a coating of rubber cement, formed by dissolving rubber in gasoline or other solvent, to both surfaces in order to increase adhesion.

The present invention contemplates an improvement in manufacturing procedure, comprising use of a dusting powder which will remove tackiness at ordinary handling temperatures, which does not require removal prior to adhesion, but instead will permit adhesion upon application of pressure, and which will dissolve into the rubber during the subsequent vulcanization to permit perfect joindure. The steps of removing the dusting powder and of applying rubber cement are thus eliminated, with substantial gain in quality of the final product.

The dusting powder I have found most desirable for the described purpose includes a resin base, which may be a para cumarone, colophony, aldehyde, or other artificial resin, with a small percentage of a mineral salt of a fatty acid, such as calcium oleate or zinc stearate. The proportion of one part of zinc stearate, for example, to nine parts ground resin, has been found satisfactory for the desired purpose.

The resin is ground fine, this fine grinding or comminuting being made possible by the addition of the zinc stearate which seems to wet or coat the resin particles; the resulting powder removes the tackiness of crude rubber surfaces at ordinary handling temperatures, but does not prevent adhesion of juxtaposed rubber surfaces when pressure is applied. Although the exact reason for this advantageous result is not known, it is probable that the application of pressure to juxtaposed rubber surfaces coated with the described dusting powder ruptures the coated surface, with possible melting or rendering miscible of the finely ground resin, and provides clean tacky rubber surfaces for contacting. The resin seems to function as a tackiness intensifier for producing perfect surface adhesion; subsequent vulcanization treatment apparently liquefies both ingredients of the dusting material, which become absorbed by or dissolved in the rubber, and the bond becomes a permanent integral joindure. Tests have demonstrated that pressure alone is sufficient to produce the desired effect; but heating may also be provided if desired.

The finely powdered resin base therefore functions as a dusting agent for coating tacky surfaces, apparently liquefies or loses its coating function upon application of pressure and exposes and increases the surface tackiness of the rubber to facilitate adhesion, and is dissolved in the rubber during vulcanization. The resin base also serves as a holding agent for the zinc stearate, which is an extremely light powder dangerous to breathe and readily blows off into the air to imperil the health of the workers. The zinc stearate functions as a mechanical coating or covering element which permits fine grinding of the resin, and becomes dissolved in the rubber during vulcanization.

The combination powder made of resin powder and zinc stearate thus functions as a crude rubber dusting powder for ordinary handling temperatures. The manufacture of rubber articles is facilitated as the novel powder permits adhesion of contacting surfaces upon application of pressure thereto, the subsequent vulcanization producing a permanent weld identical with that obtained by contacting of clean crude rubber surfaces. Adjacent surfaces which should not adhere are protected in the usual manner, by application of talc or other standard parting material.

The use of the novel dusting powder thus simplifies manufacturing procedure, reduces the cost, and improves the quality of the finished product. The new procedure is particularly suitable for the manufacture of rubber bags, the pressure being either applied by a plate type pressure die, or by a roller die, the dies being slightly heated if desired.

Another illustrative application of the new procedure is the mounting of rubber forms, such as decorative figures, numerals, and the like, on rubber bases, the forms and bases being of different colors, if desired. A simple method of applying pressure to the articles is by means of juxtaposed rollers, but any other method for pressing the forms on the rubber bases may be utilized.

The use of a granular dusting powder as described eliminates the formation of air pockets or bubbles such as are frequently found subsequent to application of rubber cement for securing adhesion. In certain manufacturing procedures, however, the dusting powder may be replaced by a liquid resinous compound or cement to reduce or to eliminate need for the applied pressure, the upper sheet, form or the like being either laid on the lower sheet, or stamped or sprayed thereon. Preferably, the pressure, when using either the resinous dusting powder or liquid cement is applied as successive light impacts on small areas, but good results have been obtained by using rollers and plate dies.

The improved resinous dusting powder or resinous cement is particularly advantageous when utilized with latex or rubber dispersions; the base sheet or portion is dusted with the powder to facilitate handling, or is coated with the cement, and the latex or rubber dispersion is sprayed thereon, or applied thereon by means of a stamping die or the like. The resinous character of the powder and the cement produces immediate adhesion and subsequent vulcanization results in a perfect weld. This procedure eliminates the present required cleaning of the rubber base before application of the latex or rubber dispersion.

While I have described novel manufacturing procedures and specific resinous dusting and coating material therefor, it is obvious that changes in the procedure used, in the ingredients utilized for the dusting and coating material, and in the proportions of the ingredients, may be made without departing from the spirit and the scope of the invention as defined in the appended claims.

I claim:

1. In the manufacture of rubber articles, the step of coating tacky rubber with a dusting powder comprising a mixture of a comminuted resin and zinc stearate.

2. In the manufacture of rubber articles by joining separate rubber elements, the steps of dusting the rubber elements to be joined with a dusting powder comprising a mixture of comminuted resin and zinc stearate, and applying pressure to said elements to produce adhesion.

3. A dusting compound for rubber comprising a mixture of comminuted resin and zinc stearate.

4. A dusting compound for rubber comprising a mixture of comminuted resin and zinc stearate in the proportion of approximately 9 parts of ground resin to one part zinc stearate.

5. In the manufacture of rubber articles, the step of coating tacky rubber with a dusting powder containing a mixture of comminuted resin and a comminuted salt of a fatty acid selected from the group consisting of calcium oleate and zinc stearate.

6. A dusting compound for rubber comprising a mixture of comminuted resin and a comminuted salt of a fatty acid selected from the group consisting of calcium oleate and zinc stearate.

7. In a dusting powder, a comminuted powder tacky at ordinary temperatures, and a cohesion-preventing powder commingled therewith.

8. In a dusting powder for rubber articles, a mixture of comminuted resin and a comminuted powder capable of preventing cohesion of the comminuted resin at ordinary temperatures.

9. In a dusting powder for rubber articles, a mixture of comminuted resin and a comminuted stearate salt capable of preventing cohesion of the comminuted resin at ordinary temperatures.

10. The method of preventing cohering of a tacky comminuted powder, comprising commingling a cohesion-preventing powder therewith.

11. The method of preventing cohering of comminuted resin, comprising commingling a cohesion-preventing powder therewith.

12. In the manufacture of rubber articles, the step of coating tacky rubber with a dusting powder comprising a mixture of comminuted resin and calcium oleate.

13. In the manufacture of rubber articles by joining separate rubber elements, the steps of dusting the rubber elements to be joined with a dusting powder comprising a mixture of comminuted resin and calcium oleate, and applying pressure to said elements to produce adhesion.

14. A dusting compound for rubber comprising a mixture of comminuted resin and calcium oleate.

15. A dusting compound for rubber comprising a mixture of comminuted resin and calcium oleate in the proportion of approximately 9 parts of ground resin to one part calcium oleate.

EZRA LLOYD HANNA.